United States Patent
Ladkani et al.

(10) Patent No.: US 11,789,821 B1
(45) Date of Patent: Oct. 17, 2023

(54) OUT-OF-BAND METHOD TO CHANGE BOOT FIRMWARE CONFIGURATION

(71) Applicant: Microsoft Technology Licensing, LLC, Redmond, WA (US)

(72) Inventors: Neeraj Ladkani, Bothell, WA (US); Kuo-Shu Huang, Woodinville, WA (US); James George Cavalaris, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/733,463

(22) Filed: Apr. 29, 2022

(51) Int. Cl.
*G06F 11/14* (2006.01)
*G06F 11/07* (2006.01)
*G06F 9/445* (2018.01)

(52) U.S. Cl.
CPC ...... *G06F 11/1417* (2013.01); *G06F 9/44505* (2013.01); *G06F 11/079* (2013.01); *G06F 11/0772* (2013.01); *G06F 11/0784* (2013.01)

(58) Field of Classification Search
CPC ............. G06F 11/1417; G06F 11/0772; G06F 11/0784; G06F 11/079; G06F 9/44505
See application file for complete search history.

(56) References Cited

U.S. PATENT DOCUMENTS 10,049,009 B2 * 8/2018 Boyapalle ........... G06F 11/0751
11,429,490 B1 * 8/2022 Sayyed ................. G06F 9/4416

FOREIGN PATENT DOCUMENTS

CN 109472131 A 3/2019

OTHER PUBLICATIONS

"Firmware Update and Manual Recovery Instructions for the X12MP/X12DP/X12SP/B12/H12/BH12 Motherboards", Retrieved from: https://www.supermicro.com/manuals/other/Firmware_Updating_Recovery_X12_H12.pdf, Apr. 27, 2021, 30 Pages.
Cheng, et al., "Out-Of-Band Management on UEFI System Firmware", Published by Technical Disclosure Commons, Feb. 22, 2018, 10 Pages.
"International Search Report and Written Opinion Issued in PCT Application No. PCT/US23/013371", dated May 22, 2023, 13 Pages.

* cited by examiner

*Primary Examiner* — Nadeem Iqbal
(74) *Attorney, Agent, or Firm* — WORKMAN NYDEGGER

(57) ABSTRACT

A computer system includes a baseboard management controller (BMC) configured to manage values of a plurality of variables stored in a flash via firmware. Managing the values of the plurality of variables includes generating a capsule containing a request for reading a value of a variable among the plurality of variables or overwriting the value of the variable with a new value. The capsule is then sent to the firmware, causing the firmware to access the flash to read the value of the variable or overwrite the value of the variable with the new value, and cause the value or the new value to be transmitted to the BMC. In response to receiving the value or new value of the variable, the BMC passes the value or the new value of the variable to a second computer system over an out-of-band network.

20 Claims, 6 Drawing Sheets

OUT-OF-BAND METHOD TO CHANGE BOOT FIRMWARE CONFIGURATION

BACKGROUND

A computer system generally has three layers of software, including firmware (e.g., UEFI/BIOS), operating system (e.g., Windows, Linux), and applications. The UEFI/BIOS is firmware that contains a collection of assembly language routines that allow programs and the components of a computer to communicate with each other at a low level. The three layers of software turn a computer into a useful machine over three stages. During the first stage, the UEFI/BIOS is configured to load a bootstrap loader. Thereafter, during the second stage, the bootstrap loader is configured to load an operating system. Finally, the operating system is configured to load application programs during the third stage.

In current cloud service solutions, UEFI/BIOS firmware settings are generally tied to fixed platform flavor, validated during bootstrapping and production. However, in some circumstances, UEFI/BIOS firmware settings can be modified inadvertently. This could lead to security issues, because the modified UEFI/BIOS settings can cause various security issues or performance issues. For example, the modified UEFI/BIOS settings may result in untrusted and/or compromised platform configurations, exposing customers to security risks. Alternatively, or in addition, the modified UEFI/BIOS settings may also result in degraded performance profiles, impacting the workloads of customers. Further, in some cases, the modified UEFI/BIOS firmware settings can also prevent the computer system or server from starting up.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

The embodiments described herein are related to a computer system having one or more processors, a baseboard management controller (BMC), and one or more computer-readable hardware storage devices. Computer-executable instructions, including firmware, are stored on the one or more computer-readable hardware storage devices. When the computer-executable instructions are executed, the BMC is configured to manage values of a plurality of variables stored in a flash via the firmware.

Managing the values of the plurality of variables includes generating a capsule containing a request for reading a value of a variable among the plurality of variables or overwriting the value of the variable with a new value. The capsule is then sent to the firmware, causing the firmware to parse the firmware file system to identify a partition in the firmware file system that stores the values of the plurality of variables, and read a value of a variable among the plurality of variables or overwrite the value of the variable with a new value. In response to reading or overwriting the value of the variable, the firmware causes the value of the variable to be transmitted to the BMC. In response to receiving the value or new value of the variable from the firmware, the BMC is configured to pass the value or the new value of the variable to a second computer system over an out-of-band network.

In some embodiments, the BMC is also configured to receive a request for reading or writing the value of the variable from the second computer system over the out-of-band network. In some embodiments, the request is received when the computer system is turned off or cannot start up.

In some embodiments, the BMC is further configured to detect an error associated with hardware or firmware of the computer system. The error prevents the computer system from starting up. In response to detecting the error, the BMC sends an error report to the second computer system over the out-of-band network. In some embodiments, the error report contains the value of the variable.

In some embodiments, the variable is a boot firmware configuration variable. In some embodiments, the variable is a unified extensible firmware interface (UEFI) boot firmware configuration variable, or basic input/output system (BIOS) firmware configuration variable. In some embodiments, reading or overwriting the value of the variable is based on one or more parameters associated with the variable. The one or more parameters include at least one of a name, a globally unique identifier (GUID), an offset, a length, or the new value of the variable. In some embodiments, the BMC is configured to receive the one or more parameters associated with the variable from the second computer system.

The principles described herein are also related to a method implemented in firmware of a computer system for allowing a baseboard management controller (BMC) to manage values of a plurality of variables stored in a flash of the computer system. The method includes generating a capsule containing a request for reading a value of a variable among the plurality of variables or overwriting the value of the variable with a new value. The capsule is then sent to the firmware, causing the firmware to access the flash to identify a partition in the firmware file system that stores the values of the plurality of variables, and read the value of the variable among the plurality of variables or overwriting the value of the variable with the new value. In response to reading or overwriting the value of the variable, the value or the new value of the variable is caused to be transmitted to the BMC. The method further includes in response to receiving the value or the new value of the variable, passing the value or the new value of the variable to a second computer system over an out-of-band network.

In some embodiments, the method further includes receiving a request for reading the value of the variable or overwriting the value of the variable with the new value from the second computer system over the out-of-band network. In some embodiments, the request is received when the computer system is turned off or cannot start up.

Additional features and advantages will be set forth in the description which follows, and in part, will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not, therefore, to be considered to be limiting in scope, embodiments will be described and explained with additional specificity and details through the use of the accompanying drawings in which.

DETAILED DESCRIPTION

Figure 1:
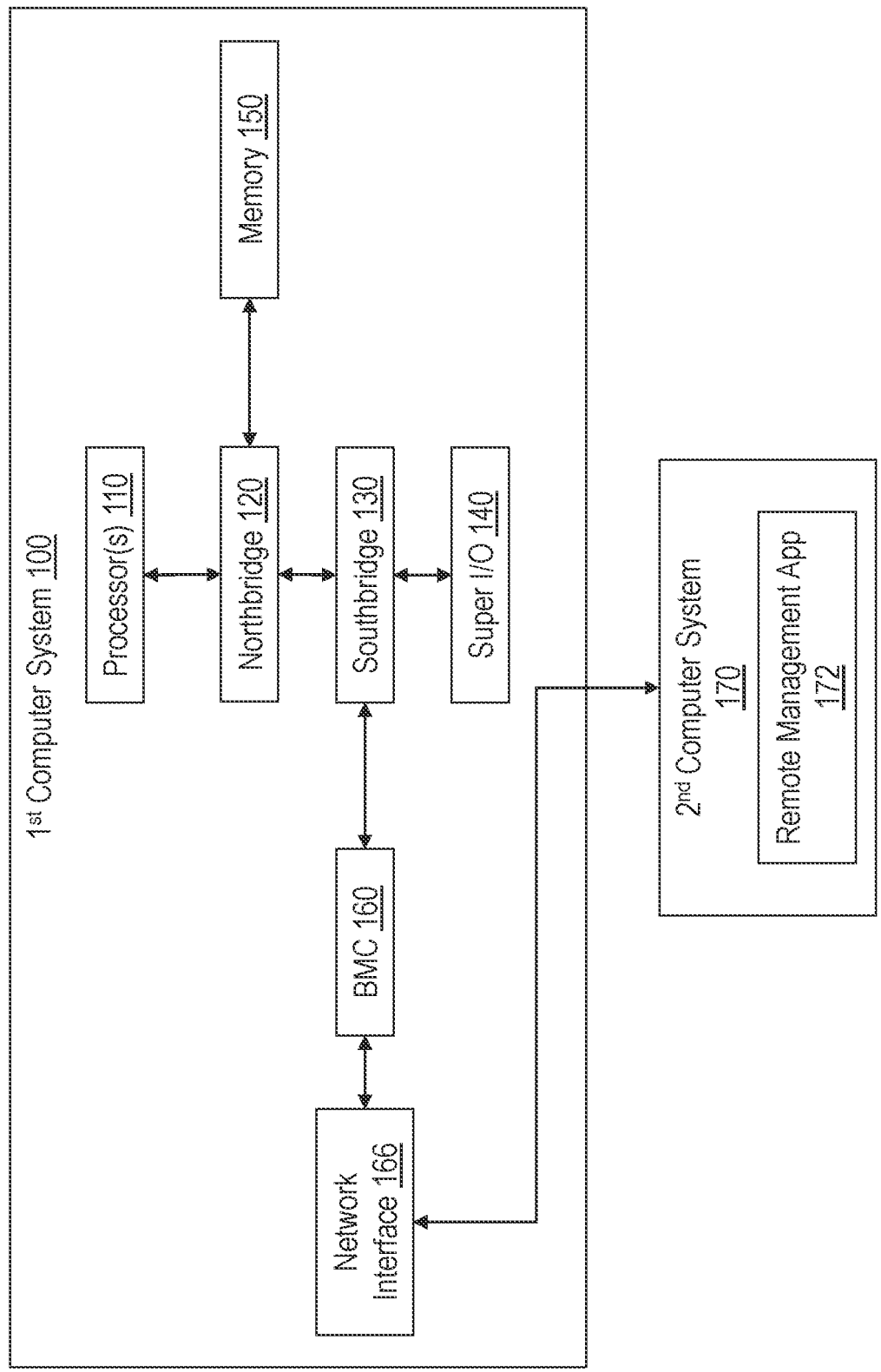
FIG. 1 illustrates an example of a computer system in which the principles described herein may be implemented.

In current cloud service solutions, unified extensible firmware interface (UEFI) and/or Basic Input/Output System (BIOS) firmware settings are often tied to fixed platform flavors. The settings are validated during bootstrapping and/or production. With advanced security threats, UEFI/BIOS firmware settings can be modified inadvertently, and the server with the modified settings may be pushed into production. This leads to security issues and other unpredictable problems because the modified BIOS settings can result in untrusted compromised platform configuration, exposing customers to security risks and/or degraded performance profile, impacting the workloads of customers. Further, in some cases, the modified UEFI/BIOS firmware settings can also prevent the computer system or server from starting up.

When a UEFI/BIOS firmware setting of a computer server is inadvertently modified, the server may be out of service. A system administrator is often required to be physically on-premise to perform diagnostic tests and/or reset all the variables to the original values. The principles described herein provide out-of-band management solutions for obtaining a value of a variable and/or writing a value of a variable remotely, as such settings of a computer system can be diagnosed, modified, and/or corrected remotely.

Out-of-band management is a solution that provides a secure dedicated alternate access method to an information technology (IT) network infrastructure to administer connected devices and IT assets without having to use a corporate local area network (LAN). The primary benefit of an out-of-band management interface is its availability even when the network is down, a device is turned off, in sleep mode, hibernating, and/or otherwise inaccessible. When a network administrator needs to monitor, manage, troubleshoot, or reboot critical IT assets, they will generally access the devices directly over an ethernet network. However, when 24/7 uptime is expected, such a single point of access is not enough. In particular, when IT assets are in off-site locations, controlled server rooms, or the network administrator is in a different location, a secure way to remotely access the IT asset becomes more important.

The principles described herein are related to a computer system configured to use a baseboard management controller (BMC) to enable the out-of-band management solution. The BMC is configured to receive a request from a remote computing system. The request may be initiated by an IT administrator at the remote computing system. In response to receiving the request from the remote computing system, the BMC is configured to access, via a multiplexer, a flash that stores a firmware file system; and parse the firmware file system to identify a partition in the firmware file system that stores the values of the plurality of variables.

In some embodiments, the BMC is configured to support a capsule service that allows the BMC to read or update data stored in the flash via the firmware. In some embodiments, reading or overwriting the value of the variable is based on one or more parameters associated with the variable. In some embodiments, the one or more parameters of the variable include a name, a globally unique identifier (GUID), an offset, a length, and/or a new value.

In some embodiments, the variable is a boot firmware configuration variable. In some embodiments, the variable is a unified extensible firmware interface (UEFI) boot firmware configuration variable, and/or base input/output system (BIOS) firmware configuration variable.

Since the principles described herein are related to a computer system, a brief description of a computer system is provided herein. FIG. 1 illustrates an example of a computer system 100 (also referred to as a first computer system) in which principles described herein are implemented. The computer system 100 includes one or more processor(s) 110 (e.g., CPU), a northbridge 120, a southbridge 130, and a super I/O 140. The northbridge 120 is often a chip in a chipset of a motherboard that directly connects to the processor(s) 110 to handle high-performance tasks. The northbridge 120 is also connected to memory 150. The southbridge 130 is another chip connected to the northbridge 120 configured to handle many of the computer system 100's I/O functions, such as USB, audio, the system UEFI/BIOS. As illustrated, the southbridge 130 is connected to a baseboard management controller (BMC) 160. The BMC 160 is connected to a network interface 166.

The BMC 160 is a specialized service processor configured to monitor physical states of hardware of the computer system. The BMC 160 is connected to the network interface 166. The network interface 166 allows the BMC 160 to communicate with a second computer system 170. The second computer system 170 has a remote management application 172 installed thereon, allowing a system administrator to see the physical states of hardware via the BMC 160.

For the hardware of the computer system 100 to work together, software is stored in hardware storage devices and loaded in the memory 150 to cause the processor(s) 110 to perform computations, read and write from hardware storage devices, and communicate with other computer systems. The computer system 100 generally has three layers of software, including firmware (e.g., UEFI/BIOS), operating system (e.g., Windows, Linux), and applications. The UEFI/BIOS is firmware that contains a collection of assembly language routines that allow programs and the components of a computer to communicate with each other at a low level. The three layers of software turn a computer into a useful machine over three stages. During the first stage, the UEFI/BIOS is configured to load a bootstrap loader. Thereafter, during the second stage, the bootstrap loader is configured to load an operating system. Finally, the operating system is configured to load application programs during the third stage.

BIOS is an older firmware, it continues to operate in 16-bit mode, which results in restricting the amount of code that can be accessed. For example, because BIOS only works in 16 bits, it cannot address more than 1 MB of space. As a consequence, it can only initialize one device at a time, and the booting might take longer. In particular, during booting, BIOS reads the first sector of the hard drive, which contains the address or code needed to initialize the next device. BIOS also determines the boot device that must be initialized for the operating system to run.

On the other hand, UEFI performs similar functions to BIOS but in a different way. UEFI stores all startup and initialization information in a .efi file rather than a firmware file. The file is located on a special partition of the hard drive called EFI system partition. On a computer system, the EFI system partition consists of the bootloader for the operating system installed. UEFI operates in 64-bit mode, meaning it has higher addressable memory, and thus, it makes the booting process faster. Furthermore, UEFI supports networking, so one can troubleshoot remotely even without installing an operating system.

Figure 2:
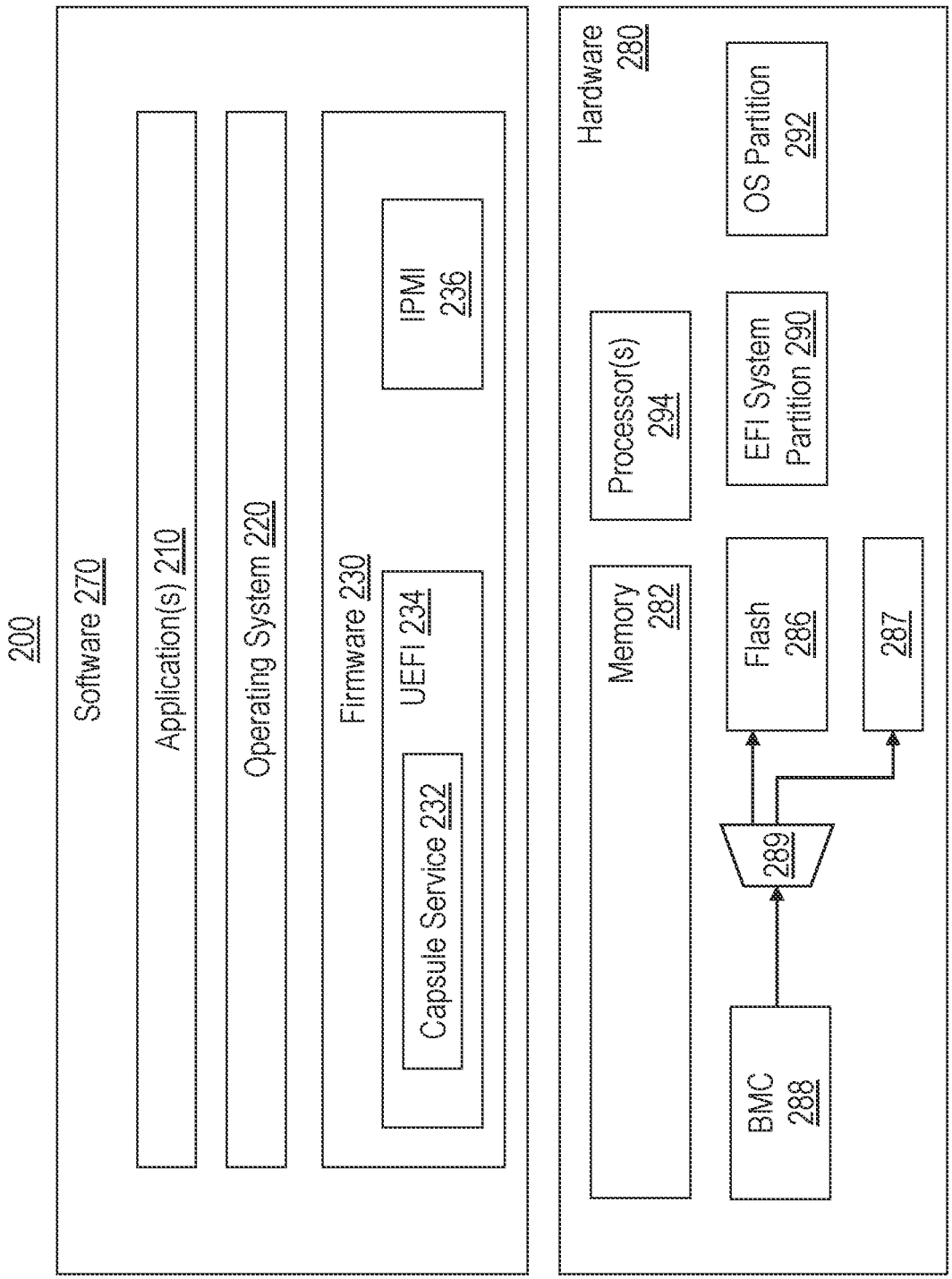
FIG. 2 illustrates an example architecture of a computer system that corresponds to the computer system in FIG. 1.

The principles described herein can be implemented with either UEFI or BIOS firmware. FIG. 2 illustrates an example architecture of a computer system 200 (corresponding to the computer system 100 of FIG. 1) in which the principles described herein are implemented. As illustrated in FIG. 2, the computer system 200 includes hardware 280 and software 270. The hardware 280 includes memory 282, one or more processors 294, a BMC 288, and hardware storage devices, such as a BMC storage 287, a flash 286, EFI system partition 290, and OS partition 292.

The software 270 includes three layers, namely firmware 230, operating system 220, and one or more applications 210. The firmware 230 includes UEFI 234 (or BIOS (not shown)) configured to load a bootstrap loader. The bootstrap loader is configured to load the operating system 220, which in turn loads the one or more applications 210. In some embodiments, the one or more applications 210 include cloud service applications.

In some embodiments, the firmware 230 also includes Intelligent Platform Management Interface (IPMI) 236 configured to control BMC 288. IPMI is firmware running on BMC conforming to IPMI standards. IPMI is often implemented on server-class platforms. IPMI defines common, abstracted, message-based interfaces between diverse hardware devices and CPU for out-of-band management.

The different layers of software are stored at different hardware storage devices. For example, the BMC storage 287 is a non-volatile storage configured to store event logs, sensor data record, and/or baseboard field-replaceable unit information that are read or written by the BMC 288. The flash 286 is configured to store firmware file system, including values of a plurality of variables, such as UEFI boot firmware configuration variables. The EFI system partition 290 is configured to store UEFI firmware. The OS partition 292 is configured to store an operating system. The BMC 288 is configured to access both the flash 286 and the BMC storage 287 via a multiplexer 289.

Further, as illustrated, the UEFI 234 includes a capsule service 232 configured to allow the BMC 288 to pass information to the firmware 230 via UEFI capsules (also referred to as "capsules"). A UEFI capsule is a data structure that can be processed by the firmware 230, causing the firmware 230 to perform various functions. For example, UpdateCapsule is an example capsule service that can be used to update the firmware stored in the flash 286 or for an operating system to have information persist across a system reset. The embodiments described herein also include additional capsule services such as reading or overwriting a value of a particular variable.

The capsule service 232 allows the BMC 288 to access the flash 286 via the firmware 230. As briefly described above, the flash 286 stores a firmware file system. The BMC 288 is configured to cause the firmware 230 to parse the firmware file system to identify a partition in the firmware file system that stores values of a plurality of variables. In some embodiments, the variables are boot firmware configuration variables. In some embodiments, the variables are UEFI boot firmware configuration variables, and/or BIOS firmware configuration variables. The firmware is also configured to read a value of a variable among the plurality of variables and/or overwrite the value of the variable with a new value based on the request from the BMC.

In response to reading or rewriting the value of the variable, the firmware 230 causes the value or the new value of the variable to be transmitted back to the BMC 288. In some embodiments, the transmission of the value or the new value of the variable is performed via the multiplexer 289. After the BMC 288 receives the value or the new value of the variable, the BMC 288 can then pass the value of the variable to a second computer system 170 and/or a remote management application 172. As such, a system administrator can remotely access values of variables of the computer system 200 even when the computer system is not turned on or cannot turn on or start up.

Figure 3:
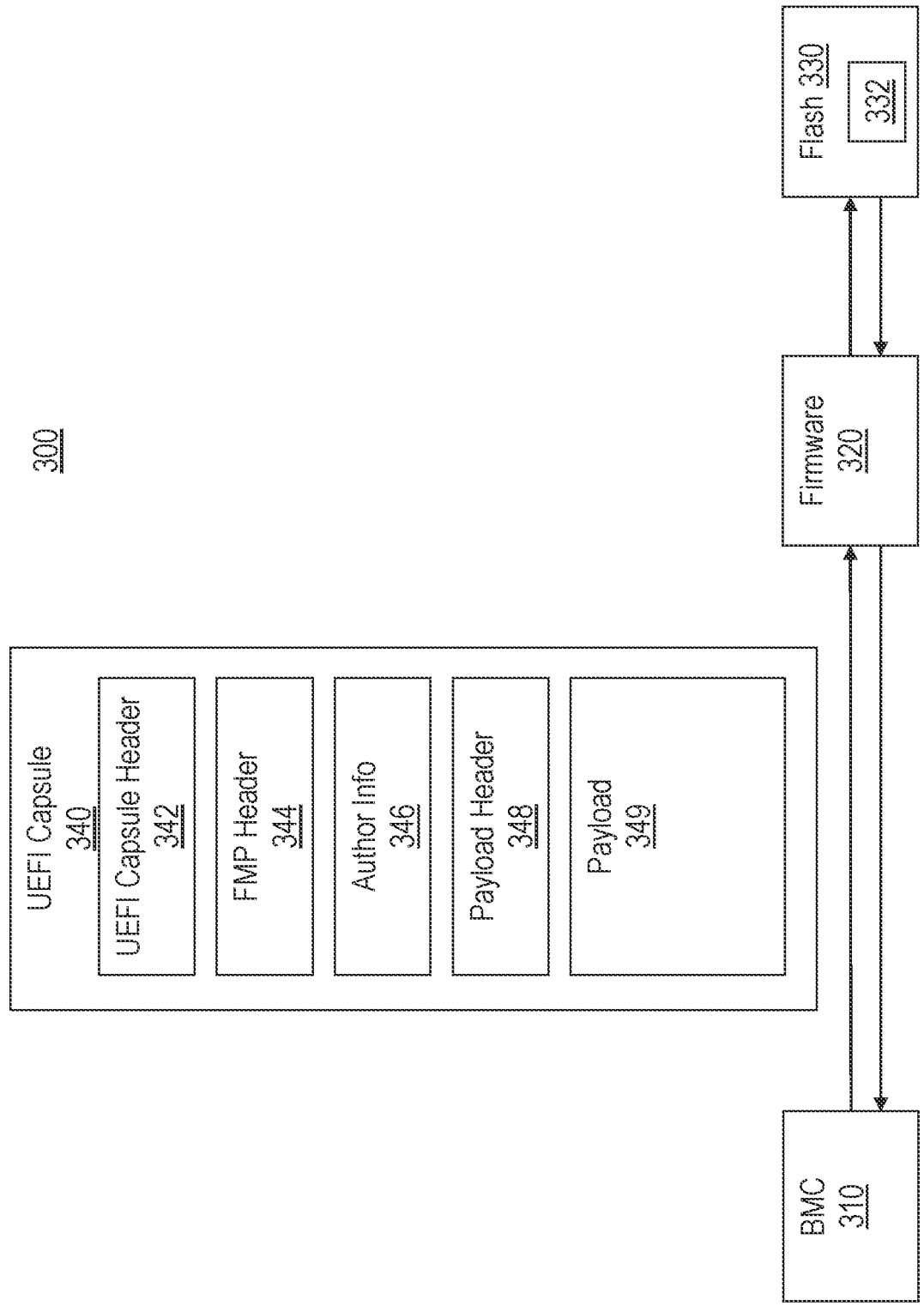
FIG. 3 illustrates an example communication pattern between a baseboard management controller and firmware of a computer system.

FIG. 3 illustrates an example communication pattern 300 between BMC 310 (corresponding to 288 of FIG. 2) and firmware 320 (corresponding to firmware 320 of FIG. 2). The BMC 310 is configured to generate a UEFI capsule 340, and send the UEFI capsule 340 to the firmware 320. Receiving the UEFI capsule 340, the firmware 320 is configured to access flash 330 (corresponding to flash 286 of FIG. 2).

A UEFI capsule (e.g., UEFI capsule) is a contiguous set of data that starts with a UEFI capsule header 342, including a capsule GUID field. The capsule GUID field in the header defines the format of the capsule. The capsule contents are designed to be communicated to the firmware. As illustrated in FIG. 3, UEFI capsule 340 further includes an FMP (Firmware Management Protocol) header 344, authentication information 346, a payload header 348, and payload 349. In some embodiments, the payload 349 includes instructions configured to cause the firmware 320 to identify a partition 332 in the firmware file system that stores values of a plurality of variables. In some embodiments, the UEFI capsule 340 also includes instructions configured to cause firmware 320 to read a value of a variable among the plurality of variables or overwrite the value of the variable with a new value.

In some embodiments, variables are defined as key/value pairs that include identifying information, attributes, and some quantity of data. Variables are intended or used as a means to store data that is passed between a UEFI/BIOS environment implemented in a platform and UEFI/BIOS OS loaders and other applications that run in the UEFI/BIOS environment. Although the implementation of variable storage is not specifically defined for a given platform, variables generally need to persist across reboots of the platform. This implies that the variables passed in for storage are retained and available for use each time the system boots, at least until they are explicitly deleted or overwritten. Thus, the variables are normally stored in non-volatile storage, such as a flash. Provision of this type of non-volatile storage may be limited on some platforms.

A fully qualified UEFI variable name includes both a human-readable text value paired with a GUID. Each UEFI variable also has some attributes associated therewith, such as (but not limited to) non-volatile attribute, BootService attribute, and runtime attribute. In some embodiments, these attributes are treated as a bit field, which implies that none, any, or all of the bits can be activated at any given time. For example, the existence of the non-volatile bit indicates that the variable is persistent across platform resets. The existence of the BootService bit indicates that the variable can be reset during the BootService phase of a platform evolution, and once the platform enters the runtime phase, the variable will no longer be set. The existence of the Runtime bit indicates the variable is accessible during all phases of the platform evolution.

Figure 4:
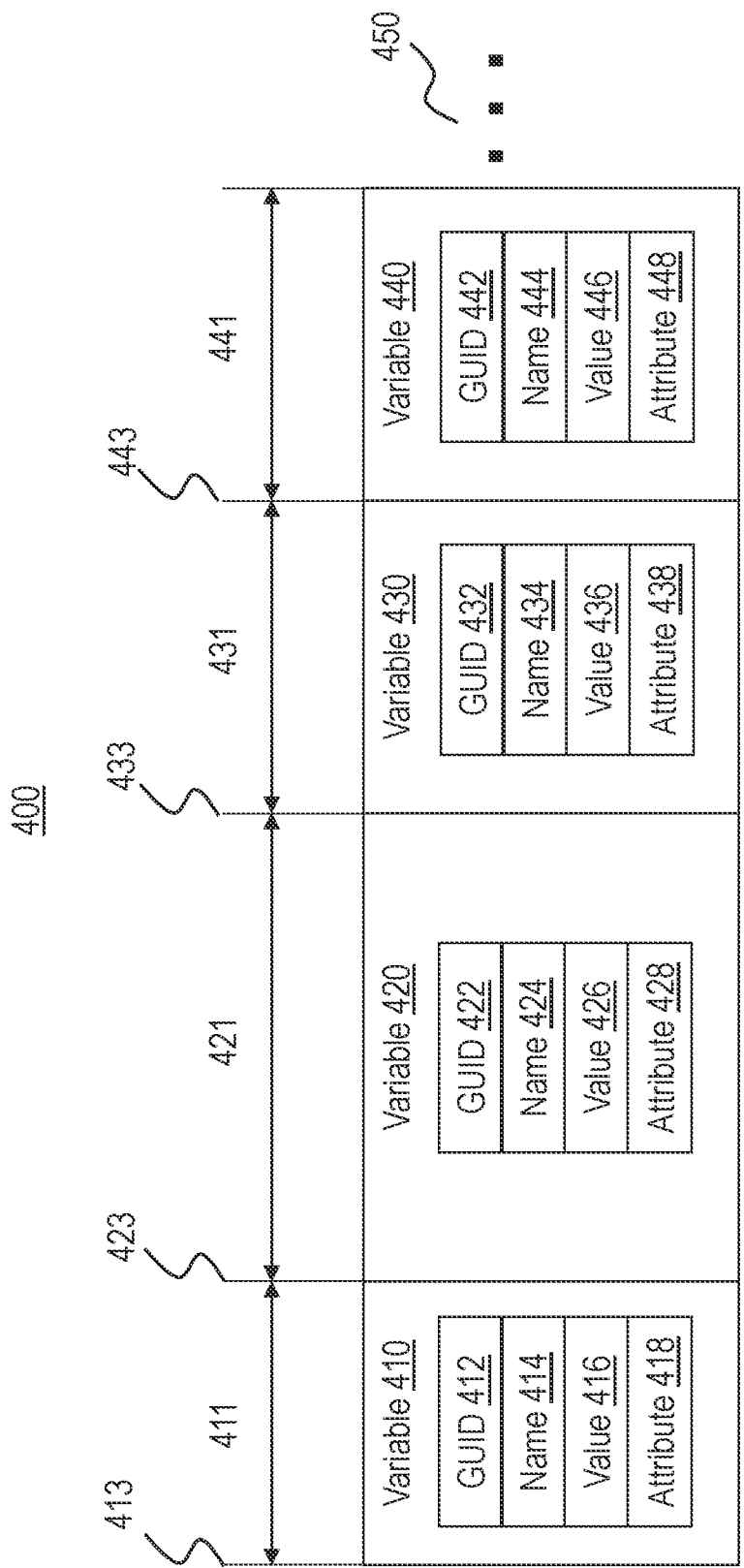
FIG. 4 illustrates an example data structure of variables that may be stored in a hardware storage device of a computer system.

FIG. 4 illustrates an example data structure 400 for storing a plurality of variables 410, 420, 430, 440. As illustrated, each variable includes a globally unique identifier (GUID), a name, a value, and one or more attributes. For example, the variable 410 includes a GUID 412, a name 414, a value 416, and one or more attributes 418. The variable 410 also has a length 411, indicating a size of the variable, and an offset 413 indicating a distance (displacement) between the beginning of the variable and a beginning of the storage. Similarly, the variable 420 includes GUID 422, a name 424, a value 426, and one or more attributes 428. The ellipsis 450 represents that there may be any number of variables stored in the storage.

The variable 420 also has a length 421 and an offset 423. For example, if variable 410 is the first variable, the offset 413 would be 0. Since the variable 420 is a variable right next to variable 410, the offset 423 of the variable 420 would be the same as the length 411 of the variable 410. Again, similar to variables 410, 420, variables 430, 440 also include their respective GUIDs 432, 442, names 434, 444, values 436, 446, and attributes 438, 448; and variables 430, 440 also have their respective lengths 431, 441, and offsets 433, 443.

These variables can be accessed via components of firmware 230. In some embodiments, the firmware 230 provides one or more variable functions configured to get a value of a given variable. For example, UEFI provides GetVariable, GetNextVariableName, and SetVariable functions.

The GetVariable function can be used to return a value of a UEFI variable. GetNextVariableName function can be used to enumerate the current variable names. The GetNextVariableName function enumerates the current variable name in the platform, and with each subsequent call to the function, the previous results can be passed into the interface; and on output, the interface returns the next variable name data. Once the entire list of variables has been returned, a subsequent call into the function providing the previous "last" variable name will provide the equivalent of a "Not Found" error.

The SetVariable function can be used to set a value of a variable. For instance, when the platform initializes the I/O infrastructure and has probed for all known console output devices, it will likely construct a ConOutDev global variable. These global variables have a unique purpose in the platform since they have a specific architectural role to play with a specific purpose.

Referring back to FIG. 2, in some embodiments, the BMC 288 is configured to obtain one or more parameters of a variable, such as (but not limited to) a GUID, a name, a length, offset of the variable, and/or a new value, and communicates the one or more parameters of the variable to the firmware 230 with a read or write request. In some embodiments, the one or more parameters are received from the second computer system 170 via the remote management application 172. In some embodiments, the BMC 288 is configured to embed the one or more parameters with a read or write request into the capsule 340. In response to receiving the capsule 340 containing the one or more parameters of the variable with the read or write request, firmware 230 is caused to call GetVariable or SetVariable function to obtain the value of the variable or set the value of the variable based on the one or more parameters. After the value of the variable is obtained or set, the firmware 230 is then configured to cause the value or the new value of the variable to be transmitted back to the BMC 288.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
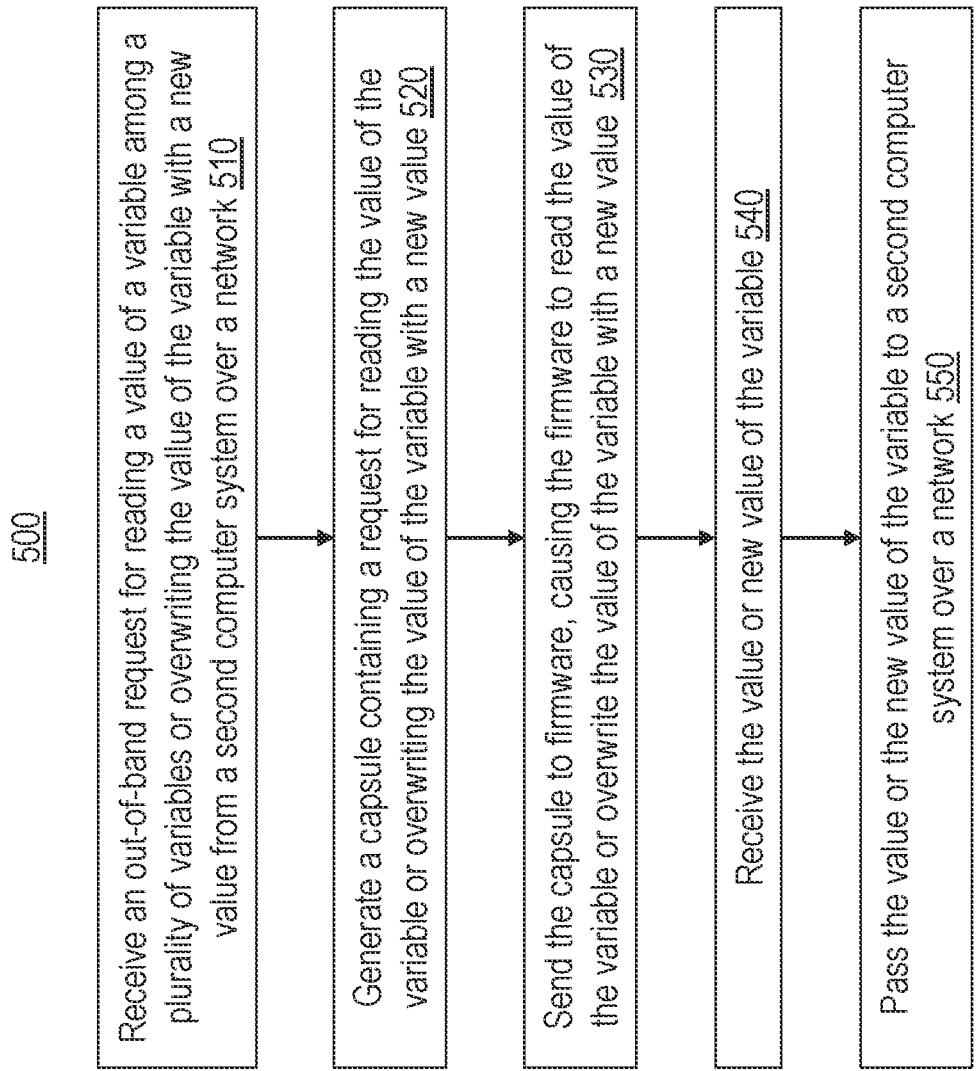
FIG. 5 illustrates a flowchart of an example method for obtaining a value of a variable, which may be implemented at a baseboard management controller (BMC) of a computer system.

FIG. 5 illustrates a flowchart of an example method 500 for out-of-band obtaining a value of a variable, which may be performed by a BMC of a computer system. The method 500 includes receiving a request for reading or writing a value of a variable from a second computer system over an out-of-band network (act 510). Values of the plurality of variables are stored in a flash of the computer system, where the flash stores a firmware file system. In response to receiving the request, the BMC is configured to generate a capsule (act 520), containing a request for reading a value of a variable or overwriting the value of the variable with a new value, and send the capsule to the firmware (act 530). In some embodiments, the variable is a boot firmware configuration variable, such as a UEFI variable or BIOS variable.

In some embodiments, the request includes one or more parameters of the variable. The one or more parameters include at least one of a name, a GUID, an offset, a length, and/or a new value of the variable. In response to receiving the capsule, the firmware is configured to parse the flash to identify a partition that stores the values of the variables, and read the value of the variable or overwrite the value of the variable with a new value based on the request and the one or more parameters of the variable. After that, the firmware causes the value or the new value of the variable to be transmitted to the BMC. Once the BMC receives the value or the new value of the variable (act 540), the BMC is configured to pass the value of the variable to the second computer system over the out-of-band network (act 550).

In some embodiments, the BMC Is further configured to detect an error associated with hardware or firmware of the computer system. In some embodiments, the error prevents the computer system from starting up. In response to detecting the error, the BMC is configured to send an error report to the second computer system over the network. In some embodiments, the error report contains the value of the variable.

Figure 6:
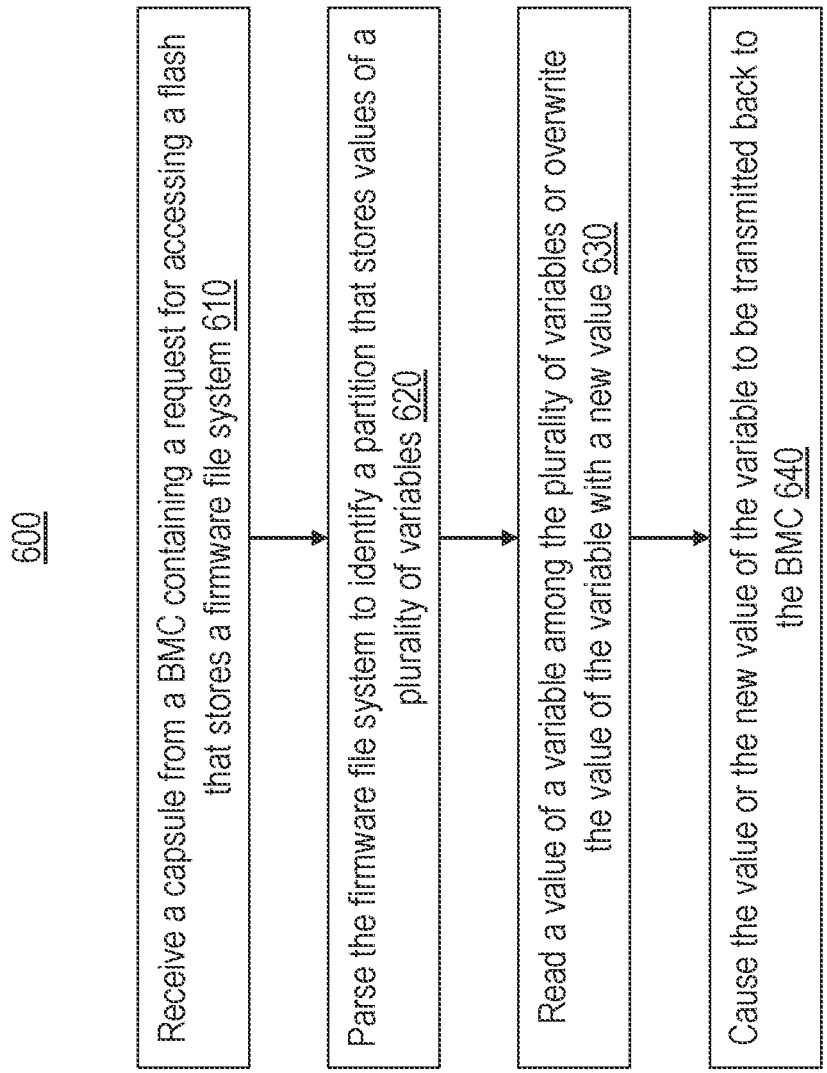
FIG. 6 illustrates a flowchart of an example method for obtaining a value of a variable, which may be implemented at firmware of a computer system.

FIG. 6 illustrates a flowchart of another example method 600 for obtaining a value of a variable, which may be performed by firmware of a computer system. The method 600 includes receiving a capsule from BMC containing a request for accessing a flash that stores a firmware file system (act 610). The method further includes parsing the firmware file system to identify a partition that stores values of a plurality of variables (act 620), and reading a value of a variable among the plurality of variables or overwriting the value of the variable with a new value (act 630). In response to reading or overwriting the value of the variable, the value or the new value of the variable is caused to be transmitted back to the BMC (act 640).

In some embodiments, the request for reading the value of the variable or overwriting the value of the variable includes one or more parameters associated with the variable. In some embodiments, the one or more parameters include at least a name, a globally unique identifier (GUID), an offset, a length, and/or a new value of the variable. When the cause of the SMI is associated with writing the value of the variable, the one or more parameters further include a new value that is to be used to overwrite the current value of the variable. The firmware reads the value of the variable or overwrites the value of the variable based on the one or more parameters.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system (e.g., computer system 100) that includes hardware, such as, for example, one or more processors (e.g., processor(s) 110) and system memory (e.g., memory 150). Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media (e.g., memory 150, flash 286, EFI system partition 290, OS partition 292). Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., network interface), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computer system, supporting an operating system and perhaps one or more other applications as well. In some embodiments, each host includes a hypervisor that emulates virtual resources for the virtual machines using physical resources that are abstracted from the view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty set, and thus "set" is defined as a non-empty set, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element, and a "subset" can exclude at least one element.

What is claimed is:

1. A computer system comprising:
   one or more processors;
   a baseboard management controller (BMC); and
   one or more computer-readable hardware storage devices having stored thereon computer-executable instructions including firmware that are structured such that, when the computer-executable instructions are executed by the one or more processors, the BMC is configured to manage values of a plurality of variables stored in a flash via the firmware, managing the values of the plurality of variables via the firmware comprising:
   generating a capsule containing a request for reading a value of a variable among the plurality of variables or overwriting the value of the variable with a new value;
   sending the capsule to firmware, causing the firmware to:
      access the flash to parse a firmware file system stored thereon to identify a partition in the firmware file system that stores the values of the plurality of variables;
      read the value of the variable among the plurality of variables or overwrite the value of the variable with the new value; and
      in response to reading or overwriting the value of the variable, cause the value or the new value of the variable to be transmitted to the BMC;
   receiving the value or the new value of the variable from the firmware; and
   passing the value or the new value of the variable to a second computer system over an out-of-band network.

2. The computer system of claim 1, wherein the BMC is configured to support a capsule service that allows the BMC to read or update data stored in the flash via the firmware.

3. The computer system of claim 1, wherein the BMC is configured to:
   receive a request for reading or writing the value of the variable from the second computer system over the out-of-band network.

4. The computer system of claim 3, wherein the request is received when the computer system is turned off or cannot start up.

5. The computer system of claim 4, wherein the BMC is further configured to:
   detect an error associated with hardware or firmware of the computer system, the error preventing the computer system from starting up; and
   in response to detecting the error, send an error report to the second computer system over the out-of-band network.

6. The computer system of claim 5, wherein the error report contains the value of the variable.

7. The computer system of claim 1, wherein the variable is a boot firmware configuration variable.

8. The computer system of claim 1, wherein the variable is a unified extensible firmware interface (UEFI) boot firmware configuration variable, or basic input/output system (BIOS) firmware configuration variable.

9. The computer system of claim 1, wherein:
   reading or overwriting the value of the variable is based on one or more parameters associated with the variable; and
   the one or more parameters include at least one of a name, a globally unique identifier (GUID), an offset, a length, or the new value of the variable.

10. The computer system of claim 9, wherein the BMC is configured to receive the one or more parameters associated with the variable from the second computer system.

11. A method implemented in firmware of a computer system for allowing a baseboard management controller (BMC) to manage values of a plurality of variables stored in a flash, the method comprising:
   generating a capsule containing a request for reading a value of a variable among the plurality of variables or overwriting the value of the variable with a new value;
   sending the capsule to firmware, causing the firmware to:
      access the flash to parse a firmware file system stored thereon to identify a partition in the firmware file system that stores the values of the plurality of variables;
      read the value of the variable among the plurality of variables or overwrite the value of the variable with the new value; and
      in response to reading or overwriting the value of the variable, cause the value or the new value of the variable to be transmitted to the BMC;
   receiving the value or the new value of the variable; and
   passing the value or the new value of the variable to a second computer system over an out-of-band network.

12. The method of claim 11, wherein the BMC is configured to support a capsule service that allows the BMC to read or update data stored in the flash via the firmware.

13. The method of claim 12, wherein the method further comprises:
   receiving a request for reading or writing the value of the variable from the second computer system over the out-of-band network.

14. The method of claim 13, wherein the request is received when the computer system is turned off or cannot start up.

15. The method of claim 14, wherein the method further comprises:
   detecting an error associated with hardware or firmware of the computer system, the error preventing the computer system from starting up; and
   in response to detecting the error, sending an error report to the second computer system over the out-of-band network.

16. The method of claim 15, wherein the error report contains the value of the variable.

17. The method of claim 11, wherein the variable is a boot firmware configuration variable.

18. The method of claim 11, wherein the variable is a unified extensible firmware interface (UEFI) boot firmware configuration variable, or basic input/output system (BIOS) firmware configuration variable.

19. The method of claim 11, wherein:
   reading or overwriting the value of the variable is based on one or more parameters associated with the variable; and
   the one or more parameters include at least one of a name, a globally unique identifier (GUID), an offset, a length, or the new value of the variable.

20. A computer program product comprising one or more hardware storage devices having stored thereon computer-executable firmware instructions that are structured such that, when the computer-executable firmware instructions are executed by one or more processors of a computer system, the computer-executable firmware instructions cause a baseboard management controller (BMC) of the computer system to perform at least:
   generate a capsule containing a request for reading a value of a variable among a plurality of variables or overwriting the value of the variable with a new value, values of the plurality of variables being stored in a flash;
   send the capsule to a firmware, causing the firmware to:
      access the flash to parse a firmware file system stored thereon to identify a partition in the firmware file system that stores the values of the plurality of variables;
      read the value of the variable among the plurality of variables or overwrite the value of the variable with the new value; and
      in response to reading or overwriting the value of the variable, cause the value of the variable to be transmitted to the BMC;
   receive the value or the new value of the variable from the firmware; and
   pass the value or the new value of the variable to a second computer system over an out-of-band network.

* * * * *